Nov. 21, 1950

S. F. LYBARGER 2,530,621

WEARABLE HEARING AID WITH INDUCTIVE PICK-UP FOR TELEPHONE RECEPTION

Filed May 26, 1947

5 Sheets-Sheet 1

Inventor
Samuel F. Lybarger

By
Brown, Critchlow, Flick & Peckham
his Attorneys

WEARABLE HEARING AID WITH INDUCTIVE PICK-UP FOR TELEPHONE RECEPTION

Filed May 26, 1947

Inventor
Samuel F. Lybarger
By Brown, Critchlow, Flick & Peckham
his Attorneys

Inventor
Samuel F. Lybarger

By
Brown, Critchlow, Flick & Peckham
his Attorneys

Inventor
Samuel F. Lybarger

By
Brown, Critchlow, Flick & Peckham
his Attorneys

WEARABLE HEARING AID WITH INDUCTIVE PICK-UP FOR TELEPHONE RECEPTION
Filed May 26, 1947

Inventor
Samuel F. Lybarger

By
Brown, Critchlow, Flick & Peckham
his Attorneys

Patented Nov. 21, 1950 2,530,621

UNITED STATES PATENT OFFICE 2,530,621

WEARABLE HEARING AID WITH INDUCTIVE PICK-UP FOR TELEPHONE RECEPTION

Samuel F. Lybarger, Canonsburg, Pa., assignor to E. A. Myers & Sons, Mount Lebanon, Pa., a partnership Application May 26, 1947, Serial No. 750,480

9 Claims. (Cl. 179—107)

Figures 1, 2:
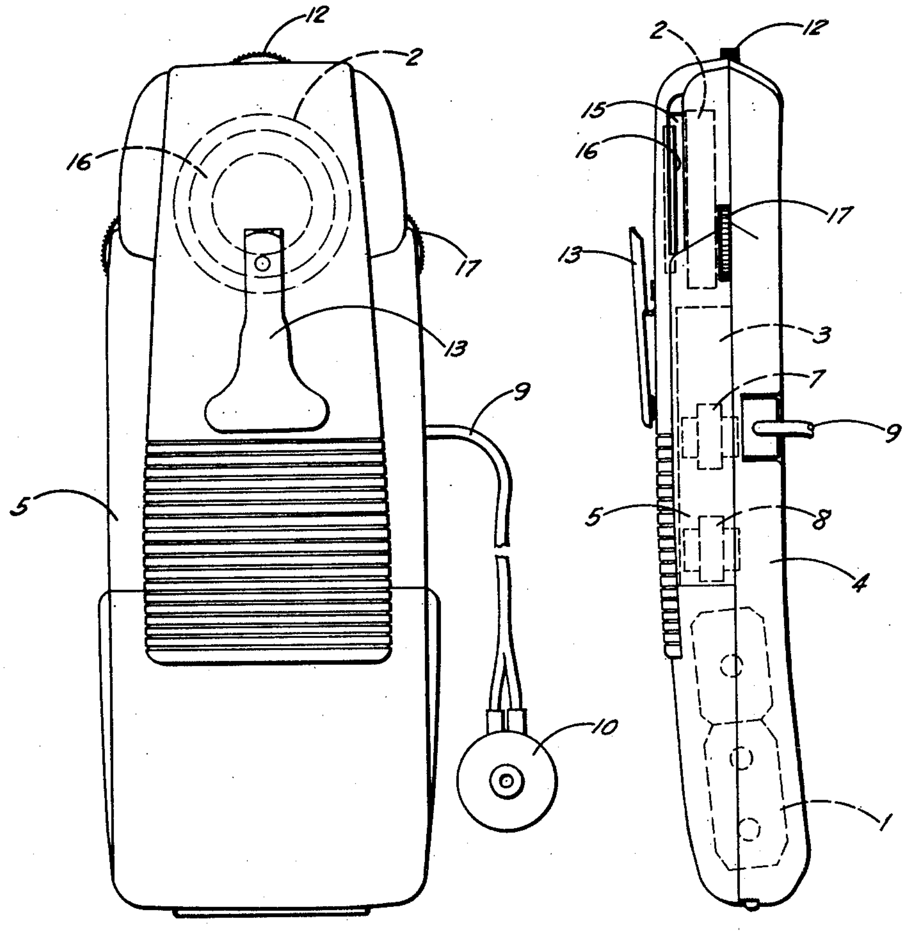

This invention relates to wearable hearing aids.

In the past it has been the custom for a hard of hearing person, while listening to a telephone, to couple the telephone receiver to his hearing aid microphone acoustically by placing the face of the receiver over the grill slots in the face of the hearing aid case. There are many disadvantages to this. In addition to having to reremove the case from the pocket or other place of concealment, it is seldom that the face of the hearing aid case fits the adjoining edge of the usual telephone receiver. As a result, poor acoustic coupling is secured. This causes serious and unpredictable distortion and, of course, permits extraneous noises and sounds to enter the microphone where they interfere with the telephone conversation. In addition to the distortion caused by poor acoustic coupling, the acoustic frequency distortion of both the hearing aid microphone and the telephone receiver enter the system, thereby reducing the quality of the transmitted speech. Another very serious difficulty is due to the fact that the listener seldom can hold the telephone receiver against the face of his hearing aid firmly and steadily enough to avoid scraping or clacking sounds that are greatly amplified by the hearing aid because they are produced so close to the microphone. Some of these faults are partially corrected by mechanical devices, such as shown in my Patent No. 1,928,669, but they are not well suited to vacuum tube type instruments where the microphone is quite small. In any event, with the acoustic coupling method there is bound to be serious frequency distortion.

It is among the objects of this invention to provide a hearing aid which is highly satisfactory for listening to a telephone without moving the hearing aid from the usual wearing position on the person, which completely eliminates extraneous sounds while the wearer is carrying on a telephone conversation, which eliminates all clacking and scraping noises due to holding the telephone receiver against the hearing aid case, which eliminates the combined acoustic distortion of the telephone receiver and microphone diaphragm as well as distortion caused by resonance and acoustic effects in the cavity between them, which permits pickup through heavy clothing without actual contact between the telephone receiver and the hearing aid, which gives any desired ratio of telephone signal to direct voice pickup while talking on the telephone, which will retain the correct frequency-amplification characteristics for either telephone or direct speech pickup, and which can be used with equal effectiveness with a radio set.

In accordance with this invention the hearing aid is the type which is worn on the person, such as in the pocket, and includes the usual microphone, amplifier and receiver all of which are electrically connected so that sounds picked up by the microphone will be amplified and transmitted through the receiver to the ear. The hearing aid also includes an inductive pickup coil which is adapted to respond to or pick up the electromagnetic waves from the audio-frequency magnetic field of an adjacent sound reproducing instrument, such as a radio or telephone. For the sake of brevity, but without any idea of limiting the invention thereto, most of the claims herein will refer to a telephone receiver. The pickup coil is electrically connected to the amplifier so that inductive pickup from the telephone receiver can be effected. The coil can be left in circuit all of the time, but it is preferable to provide an electric switch for cutting it out of the circuit when it is not being used to listen to a telephone. Although a greater or lesser degree of acoustic pickup can be combined with the inductive pickup from a telephone receiver by leaving the microphone in the circuit, it generally is preferred to switch the microphone out of the circuit at the same time the pickup coil is switched in. In such a case, the only sounds that the hearing aid transmits to the ear are those produced by the electromagnetic waves emanating from the telephone receiver. The sound waves produced by the receiver diaphragm have no effect on the hearing aid because the latter's microphone is not in circuit at that time. Thus, all frequency distortion and other noises are eliminated. The response characteristics of the different elements of the hearing aid are such that the over-all frequency response from a speaker's mouth to the eardrum of the hard of hearing person is substantially the same whether the speech transmission to the hearing aid is direct from the mouth or through the medium of a telephone. It is highly desirable to place a small element of magnetically permeable material next to the pickup coil to neutralize electromagnetic coupling between the output transformer of the hearing aid and the coil so that self-oscillation will not occur in the system.

Figure 4:
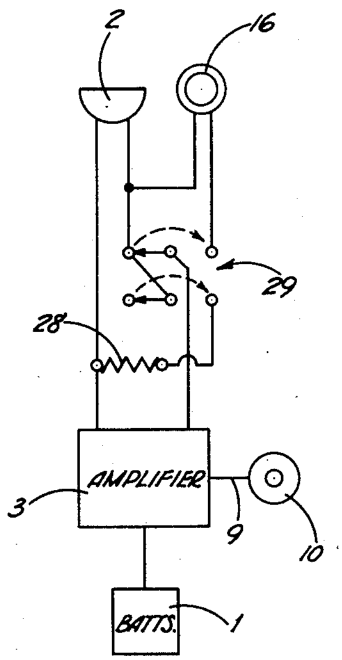
Figure 3:
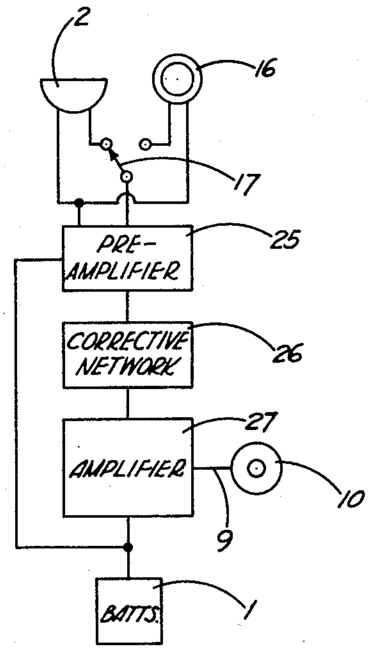
Figure 5:
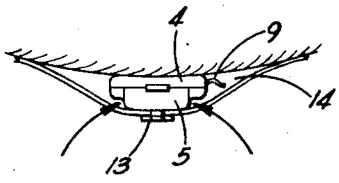
Figure 14:
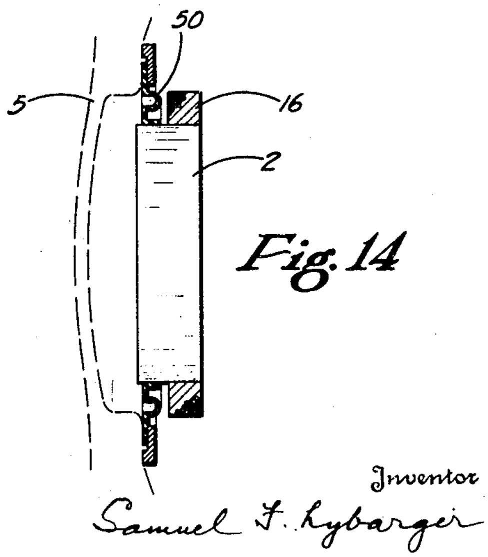
Figures 6, 7:
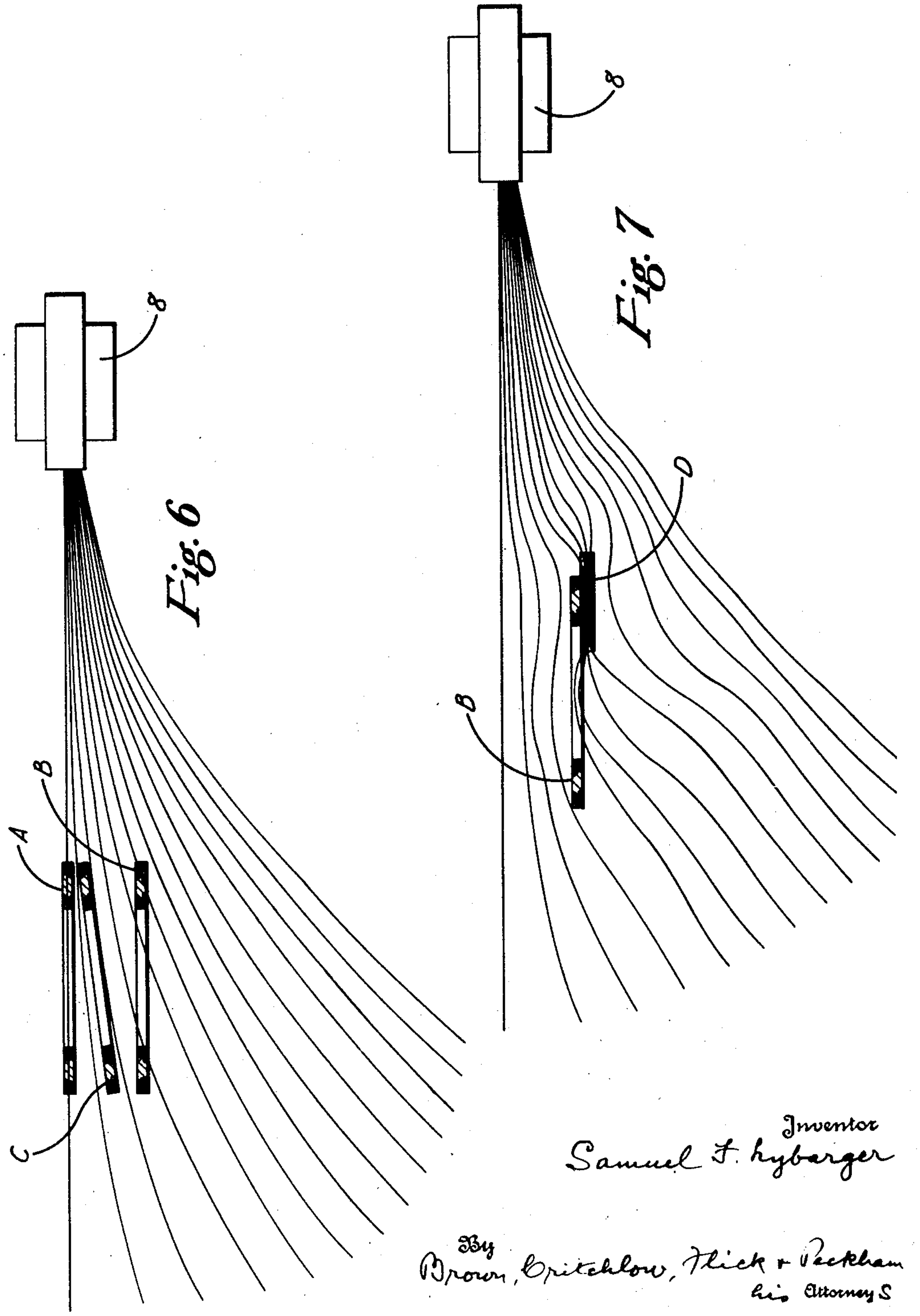
Figure 8:
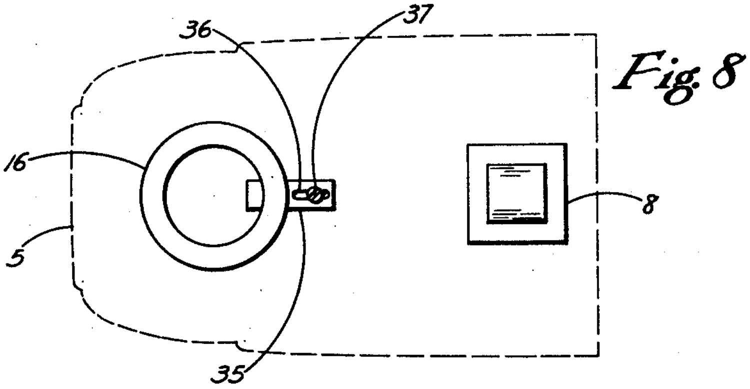
Figure 9:
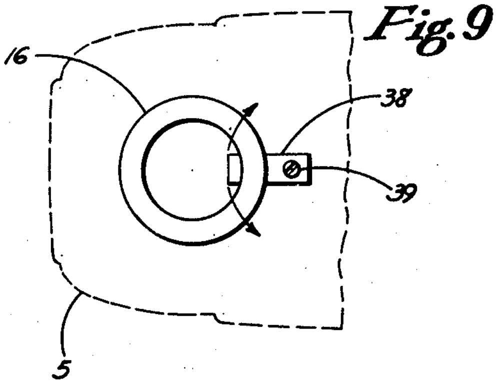
Figure 10:
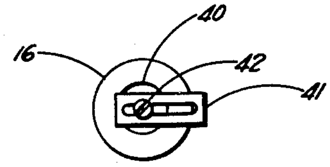
Figure 11:
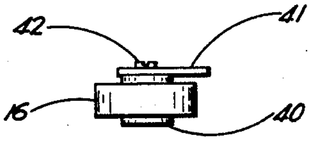
Figure 12:
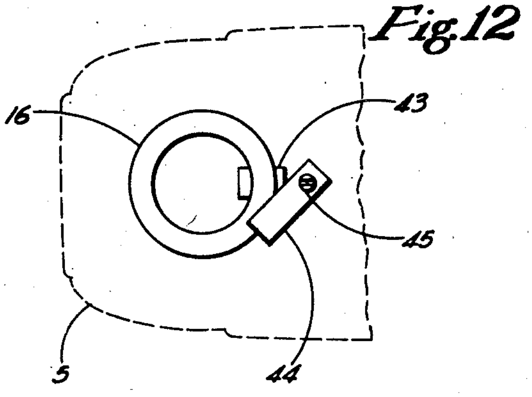
Figure 13:
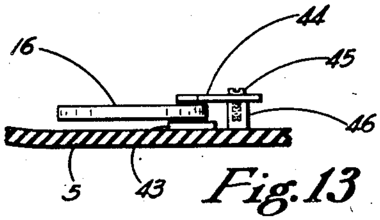
Figure 16:
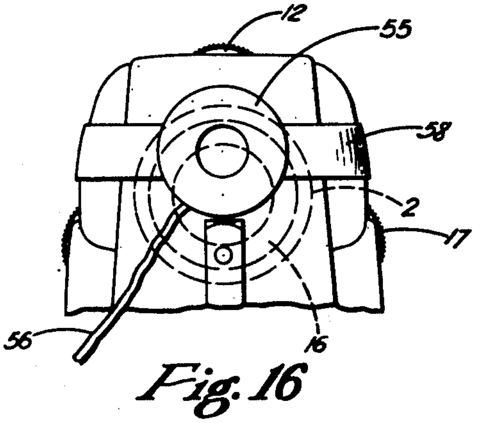
Figure 17:
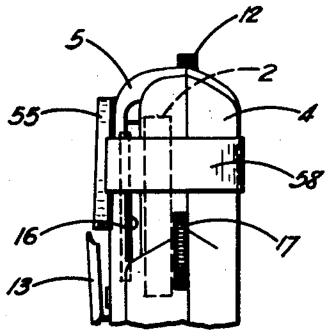
Figure 15:
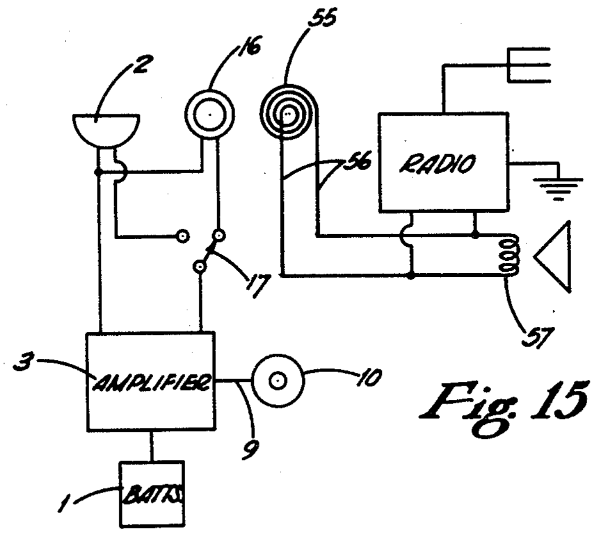

The invention is illustrated in the accompanying drawings in which Fig. 1 is a front view of my hearing aid; Fig. 2 is a side view of the case; Fig. 3 is a diagrammatic view showing the different elements of my hearing aid wired together; Fig. 4 is a view similar to the preceding figure but with no means for switching the microphone out of the circuit; Fig. 5 is a reduced plan view illustrating the appearance of the hearing aid case in a pocket or the like; Fig. 6 is a diagram of an output transformer with pick-up coils shown in different positions in its magnetic leakage field; Fig. 7 is a view similar to the preceding one, but with the shape of the field distorted by a neutralizing element; Figs. 8 and 9 are fragmentary views of the inside of the front section of a hearing aid case showing different adjustable neutralizing elements; Fig. 10 is a front view of a further form of neutralizing element; Fig. 11 is a side view of Fig. 10; Fig. 12 is a view similar to Figs. 8 and 9 of another type of neutralizer; Fig. 13 is a side view of Fig. 12; Fig. 14 is an enlarged side view of a microphone supporting a pickup coil; Fig. 15 is a diagrammatic view of my hearing aid being used for listening to a radio; Fig. 16 is a fragmentary front view of the hearing aid case provided with an attachment for listening to radio programs; and Fig. 17 is a side view of the preceding figure.

Referring to Figs. 1 and 2 of the drawings, the hearing aid shown is the type in which the batteries 1 are mounted in a compartment in the lower part of the same case that contains the microphone 2 and amplifying unit 3. However, this invention is not limited to such a case, as it is equally applicable to a shorter case with the battery unit separated from it. The case has a recessed back portion 4 by which most of the elements are supported, and a deep cover 5 that encloses and conceals those elements. The microphone is spaced from the front wall of the case and is electrically connected to the amplifying unit in the usual way. The amplifier preferably is of the vacuum tube type and includes an input transformer 7 and an output transformer 8. An electric cord 9 extends from the amplifier through the side of the case and is connected to an air conduction receiver 10 that is worn in the ear, or to a bone conduction receiver. The amount of amplification desired is controlled by the volume control wheel 12 projecting through the top of the case. Mounted on the front of the case is a spring clip 13 for attaching the case to the clothing, such as to the front of a pocket in which the case is carried.

The hearing aid disclosed thus far is more or less conventional and includes, in addition to the elements described, the usual vacuum tubes, condensers and other elements which make up the amplifier and corrective network in such a hearing aid. The front or cover of the case, however, is not conventional but has been altered to improve it over those known heretofore by making the front face solid without the usual slots for sound. The central portion of the cover projects ahead of the rest of it to which it is connected by narrow side walls. Near the top of the case these side walls are provided with vertical slots 15 through which sound can enter the case. This arrangement substantially eliminates the noise that used to occur due to clothing rubbing across the grill slots in front of the case and also due to the resonating chamber formed between the clothing and the microphone diaphragm. As shown in Fig. 5, when the present case is carried in a pocket 14 the material of the pocket does not scrape across the side slots or form a resonating chamber therewith. Nevertheless, the pocket being open at the top and down beside the side slots, sound is free to enter the slots. Another important advantage of having only side slots is that this hearing aid is fairly directional at high frequencies, thus reducing the ratio of noise to signal and also giving the user a better sense of direction than might otherwise be the case.

With such a case it would not be practicable to hold a telephone receiver against the front of the case because there are no sound openings there, and it would be even less practicable to leave the case in the pocket and press the receiver against the cloth between it and the case in order to provide acoustic coupling. For the reasons pointed out at the beginning of this specification, acoustic connections between a telephone receiver and a hearing aid are not satisfactory anyway. Therefore, another feature of this invention is that such acoustic connections can be avoided and yet reception from a telephone can be greatly improved. Accordingly, an inductive pickup coil 16 is mounted in the case, preferably by attaching it to the front wall of the case in front of the microphone. If desired, however, the coil may be located in other positions within the case or even outside of it, and the coil need not have the flat annular shape shown in the drawings. This coil normally is not in circuit with the rest of the hearing aid, but it can be switched into the circuit, as shown in Fig. 3, by means of an electric switch 17 which preferably simultaneously disconnects the microphone from the circuit. The pickup coil is simply a number of turns of insulated wire, the number depending upon the circuit into which the coil is connected. If it operates into a low impedance circuit, for example the primary of a step-up transformer, it need have only a relatively small number of turns. If the coil operates into the grid of the first tube of the amplifier, then it must be composed of a considerable number of turns of smaller wire. The coil will respond to the audio-frequency magnetic field of an adjacent telephone receiver by picking up the electromagnetic waves emanating from the telephone receiver coils. The pickup coil should not be so small as not to have enough magnetic lines of force flowing through it from the audio frequency field of the telephone receiver to give a satisfactory voltage. It has been found that a coil of about 3/4 inch inside diameter and 1 1/16 inches outside diameter with a thickness of about 1/8 inch is very satisfactory. When the signal is fed through a 70 to 7700 turns ratio input transformer, a coil having about 100 turns is very satisfactory.

The location of the sound slots in the case, or even their existence, has no effect on the operation of the pickup coil. Also, while the coil is in circuit it makes no difference if the telephone receiver or the clothing scrapes against the case, because acoustic sound waves are not picked up by the pickup coil. It is unnecessary to remove the case from the pocket because the telephone receiver can be held close to or against the pocket and the electromagnetic waves will pass through the clothing and into the case without difficulty.

It is not necessary, however, that the telephone receiver be held in any exact position relative to the pickup coil, for with a high-gain-amplifier type of hearing aid there is enough pickup at a distance of one or one and one-half inches from the pickup coil to give adequate speech intensity for most hard of hearing people. It also has been found that there are many places around the telephone receiver where good performance can be obtained. For example, good pickup results even when the back or heel of the telephone receiver is held near the pickup coil. The position of best pickup depends on the orientation of the parts inside the particular telephone. Since all of the pickup results from the inductive coupling between the pickup coil and the audio frequency magnetic field around the telephone receiver, it is obvious that no mechanical contact is required.

The volume adjustment required for the telephone pickup can, in general, be made about the same as for average speech pickup for the individual. If further volume adjustment is desirable, it can be made by turning the control wheel 12 or by moving the telephone receiver toward or away from the pickup coil. However, small variations in the position of the telephone receiver do not make very much difference in sound intensity, which is a distinct advantage in that the user does not have to be so particular to hold the receiver in an exact location relative to the pickup coil while he is telephoning.

The usual modern hearing aid is provided with a corrective network to give it tailor-made response characteristics with frequency. Such networks are well known to those skilled in this art. Also, the microphone has certain response characteristics and the receiver has certain response characteristics, all of which combine to give the hearing aid the desired over-all response. Fig. 3 is a diagram of a system that will accomplish the desired results. The amplifier is shown divided into three parts; the first stage 25 of the amplifier, the corrective network 26 used in the amplifier, and the output portion 27 of the amplifier. When using the telephone pickup certain changes in frequency response occur as compared to listening directly to a telephone receiver or to a speaker. To take care of that situation, my pickup coil should have such response characteristics that the difference between the response characteristics of the microphone and those of the coil will be such that the over-all frequency response from a speaker's mouth to the eardrum of the hard of hearing person will be substantially the same when the pickup coil is in circuit as when the microphone is in circuit and receiving speech directly. The response characteristics of the pickup coil may be changed by regulating its size and number of turns, or by associating with it additional circuit elements, such as condensers or resistors, to alter the frequency response. The microphone response may be altered by its acoustical design or by the additional circuit elements just mentioned.

In some cases it may be desirable not to cut the microphone out of the circuit entirely when the pickup coil is being used. A circuit by which this can be accomplished is shown in Fig. 4. It includes a shunting resistor 28 which reduces the output of the microphone while the pickup coil is being used. A switch 29 is used to simultaneously switch the pickup coil and resistor into and out of the circuit. With this system a person listening to a telephone can also carry on a side conversation with someone near him by direct acoustic pickup through the microphone, and yet not be bothered by external noises in the vicinity of the speaker.

A serious practical difficulty in making my hearing aid is that in the small space available, the pickup coil and output transformer 8 must necessarily be very near each other. The electromagnetic feedback between them may cause oscillation in the system. In fact, feedback will be extremely difficult to prevent unless the means described below are employed. The nature of the feedback caused by electromagnetic coupling between the output transformer and the pickup coil depends on a number of factors. These factors are the relative spatial positions of the output transformer and the pickup coil, the amount of gain at different frequencies in the amplifier, the phase shift at different frequencies in the amplifier, the number of turns and size of wire on the pickup coil, the size and shape of the pickup coil, the location of other iron parts near or between the pickup coil and the transformer, and the polarity of connection of the pickup coil and transformer or transformers.

Prevention of self-oscillation in the system is an important feature of this invention. Generally speaking, three conditions are encountered. First, the phase of the voltage induced in the pickup coil by the output transformer field causes positive feedback in the frequency range it is desired to amplify. When this positive feedback exceeds a certain small amount, a strong self-oscillation of the system occurs. Second, there is a range where the feedback ranges from a small amount positive to a larger amount negative, where no oscillation occurs. When the feedback is reduced to this range by locating the pickup coil or other means so that extremely few alternating lines of force from the output transformer field thread the pickup coil, the system may be considered neutralized and in a stable operating condition. Third, there is a range where the feedback is negative. A moderate amount of negative feedback will not cause instability, although it may reduce gain. Larger amounts of negative feedback in the desired frequency range may prove to be positive feedback outside this range, because of the different phase shift in the system at different frequencies, and oscillation will result. Generally this oscillation is found to occur at a high, but audible, frequency.

Fig. 6 shows an output transformer and the approximate shape of a portion of its audio-frequency leakage field, taken in a plane containing the axis of the transformer winding. A pickup coil of flat annular construction is indicated in three different positions, A, B, and C, where the coil is shown sectionally through its center. Voltage will be induced in the coil only when magnetic lines of force from the leakage field of the output transformer thread the coil and continue on.

When the coil is in position A, it is symmetrically located with respect to the field, and no lines of force should cut through the central area of the coil. This is a theoretical situation only, however, for in practice it is found that the external leakage field of the transformer is not symmetrical, nor even the same from transformer to transformer. Furthermore, the presence of other magnetic parts near the pickup coil will materially affect the shape of the field.

When the coil is in position B, it can be seen that its central area is threaded by some lines of force. This off-axis position is probably most typical of the positions actually encountered.

Position C of the coil shows that by tipping the coil it is possible to avoid having lines of force go through its center. It must be remembered that in practical cases this is difficult, and it may be necessary to provide means for tipping in two directions because of the non-symmetry of the leakage field from the transformer. The transformer may also be tipped to prevent coupling. This also is a mechanically difficult procedure and the amount of tipping is double that required for the coil.

Electromagnetic coupling between the output transformer and the pickup coil can be prevented by magnetically shielding the transformer with a high permeability shield. To do this adequately requires the addition of considerable weight and size to the hearing aid, which is undesirable. Such shielding also adds to the cost of production. Even with moderate shielding enough stray flux may exist to cause oscillation.

Objectionable electromagnetic coupling can be avoided in some cases by spacing the pickup coil, properly oriented, from the output transformer far enough that the audio-frequency magnetic leakage flux from the transformer will not have a material effect on the coil. The pickup coil 16 shown in Fig. 2 is spaced a considerable distance from output transformer 8. With low gain amplifiers this distance may be decreased, but in no case should it be less than the length of the transformer core. With high gain amplifiers the distance between pickup coil and output transformer can be reduced in the manner described in the following paragraphs.

I have found that accurate and controllable neutralization of the electromagnetic coupling between the output transformer and the pickup coil can be achieved with the use of only small amounts of magnetically permeable material, if it is properly located so as to distort the shape of the audio-frequency magnetic leakage field of the output transformer in the immediate vicinity of the pickup coil in such a way that the number of lines threading the pickup coil is reduced to an amount small enough to prevent undesirable feedback. This invention takes advantage of the fact that when the neutralizing element is placed on one side of the pickup coil it is magnetized by induction from the magnetic field of the output transformer. This causes the neutralizing element to act as a new source of alternating flux with a field shaped somewhat similar to that of a bar magnet. The net field in the region of the pickup coil will then be the resultant of the original field and the induced field in the neutralizing element. This situation is clearly shown in Fig. 7, which is the same as Fig. 6 with the pickup coil in position B, but with a neutralizing element D added. As can be seen from this figure, the net field does not have an appreciable amount of flux lines threading the pickup coil, so undesirable feedback is eliminated. Some lines of force may start to cut through the coil, but the effect is cancelled out by the same line turning back in the opposite direction inside the coil.

By a proper choice of the length, cross section, permeability and position of the neutralizing element, feedback from the output transformer to the pickup coil can be virtually eliminated. A typical neutralizing element is a piece of high permeability nickle-iron alloy one-half inch long with a cross section $\frac{3}{16}'' \times \frac{1}{64}''$. There are a number of ways in which such a neutralizing element can be adjusted. For example, as shown in Fig. 8, the element 35 can be provided with a longitudinal slot 36 through which extends a screw 37 by which the element is adjustably secured to the case cover 5 for adjusting the amount of neutralization. Fig. 9 shows a neutralizing element 38 connected to the case cover by a screw 39 extending through one end of the element outside of the coil. The inner end of the element can be swung in an arc to make the desired adjustment.

It will be obvious that there are further ways of adjustably mounting a neutralizing element beside the pickup coil so that the element can be moved toward and away from the coil. Thus, in Figs. 10 and 11 the pickup coil is provided with a magnetically permeable core 40 to increase its sensitivity. Neutralization of electromagnetic coupling can be achieved by adjustably mounting a magnetically permeable element 41 on one end of the core by means of a screw 42, and by sliding or rotating that element relative to the core until neutralization is effected. To give access to screw 42, the coil may be mounted on the back section of the case with the screw head at the front.

It is frequently desirable to put the pickup coil as close to the front face of the microphone as possible. In fact, a desirable location for the coil is in a depression in the inner surface of the hearing aid cover. This location permits very close proximity of the pickup coil and telephone receiver, and thereby is more efficient. However, with such a location of the pickup coil it is difficult to provide a neutralizing adjustment in front of the coil, which is generally where it will be needed with the usual arrangement of transformers and other components. On the other hand, it is not so difficult to mount a fixed neutralizing element in front of the coil. In some cases such a fixed element is all that is needed, if the similarity, uniformity and mounting of output transformers for different units are such that their external fields have essentially the same shapes. There is a considerable advantage, however, in having an adjustable neutralizing element. A way of accomplishing this objective without having a variable or adjustable element in the front of the pickup coil is to over-neutralize the front of the coil by placing a larger neutralizing element 43 in front than is necessary, as shown in Figs. 12 and 13. This generally will result in excessive negative feedback and oscillation at a high audio frequency. Therefore, another neutralizing element 44, adjustable in construction, is added in back of the coil. For example, element 44 may be pivotally connected by a locking screw 45 to a post 46 integral with the cover. The adjustable portion 44 of the neutralizing system is then easily accessible from the back of the coil when the case is opened. This neutralization on the side of the pickup coil opposite to that where it normally is required by the shape of the external magnetic field of the output transformer may also be necessary when there are magnetic elements in the hearing aid or on the hearing aid casing which may already be causing over-neutralization at the front of the coil. Such is the case, for example, when a metal clip made of some magnetic material is used in close proximity to the front of the coil.

While all of the neutralizing devices suggested herein have been based on the general type of field shape shown in Fig. 7, it is obvious that they also will work with other field shapes, although the location of the neutralizing element may have to be changed in respect to the output transformer. This entire problem becomes more important as the pickup coil is located closer to the output transformer. That is, the smaller the hearing aid becomes, the more difficult is the problem because a larger separation between the output transformer and the pickup coil is not possible. Even with a shielded transformer a neutralizing element in close proximity to the pickup coil is highly desirable if the pickup coil is very close to the transformer.

Because of phase shift in the amplifier and in the elements connected to the amplifier, it has been found that correct neutralization of the pickup by the pickup coil from the output transformer is hard to maintain for all frequencies. If the neutralization is correct for the usual range of speech frequencies, it generally is found that oscillation may still occur at extremely high audio frequencies. This difficulty is very easily remedied by using an amplifier system in connection with the pickup coil which cuts out the high frequencies above the necessary point for good speech or other sound reception. It has been shown experimentally that the frequencies above about 4000 cycles are not of importance for excellent speech reception. The fact that almost everyone turns the tone control on his radio set, for example, toward the "low" position when listening to music also indicates a general preference for a cutting of the high frequencies for music reception. Therefore, an amplifier which has a high frequency cut, preferably as sharp as possible, above the desired operating frequency limit is very desirable in connection with the pickup coil system. Such a cutting action in an amplifier may be achieved by a number of known means, for example, shunting capacitances across the circuit in the amplifier or by using a low pass filter in one of the amplifier circuits.

Another place where the pickup coil may be mounted is on the microphone 2 itself, as shown in Fig. 14. This particular microphone is shown supported in a flexible rubber ring 50 that is clamped or otherwise attached to the front wall of the case. In addition to placing the coil close to the axis of output transformer 8, this arrangement also benefits the microphone because it increases its weight and inertia and thereby makes its resilient mounting more effective for preventing case vibration from reaching the microphone and causing disturbing noises.

It has been found that this hearing aid is especially suitable for listening to radio sets where the same distortion and noise problems have been encountered as in the case of telephones. All the prior disadvantages can be avoided by making use of the inductive, rather than the acoustic, pickup of this hearing aid. A number of ways of coupling the pickup coil to the radio are possible. The hearing aid can be held near the loud speaker voice coil of the radio, or near other radio frequency component which produces a stray audio frequency field. It is more convenient and satisfactory, however, as shown in Fig. 15, to connect a small coil 55, consisting of a suitable number of turns of wire, to the radio by a flexible electric cord 56, and to hold this coil near the pickup coil 16 of the hearing aid. The coil 55 can be quite small and should have an impedance materially greater, such as four or five times more, than the impedance of the radio output circuit so that it does not create any appreciable shunting effect. One of the most satisfactory places to connect coil 55 is across the voice coil 57 of the radio loud speaker. By holding the inductive coil 55 near the pickup coil of the hearing aid, the pickup coil will be coupled inductively to the audio frequency magnetic field around the coil connected to the radio. Coil 55, suitably enclosed, preferably is mounted on an elastic band 58 which may be slipped over the upper part of the case to hold the coil in position, as shown in Figs. 16 and 17. This frees both hands of the wearer and permits him to sit in any position relative to the radio, depending upon the length of the electric cord 56. The radio volume can be turned so low that a person with normal hearing will barely hear it, and still there will be an adequate amount of pickup for the hard of hearing person.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. In a wearable hearing aid having a receiver, a case adapted to be worn by a hard of hearing person and having a front wall, a microphone mounted in the case but spaced from said front wall, an inductive pickup coil mounted in the case in the space between the microphone and said front wall, an amplifier, means electrically connecting the amplifier to the microphone and receiver, said pickup coil being adapted to respond to the audio frequency magnetic field of an adjacent telephone receiver, and an electric switch for electrically connecting said coil to said amplifier to provide for inductive pickup from the telephone receiver.

2. In a wearable hearing aid having a receiver, a case adapted to be worn by a hard of hearing person, the front of the case being substantially solid and the sides of the case being provided with sound admission openings, a microphone mounted in the case adjacent said openings in a plane substantially parallel to a plane passing through said openings, an amplifier, means adapted to electrically connect the microphone to said amplifier and receiver, an inductive pickup coil mounted in the case, said coil being adapted to respond to the audio frequency magnetic field of an adjacent telephone receiver, and an electric switch for electrically connecting said coil to said amplifier, whereby to provide inductive pickup from the telephone receiver.

3. In a wearable hearing aid having a receiver, a case adapted to be worn by a hard of hearing person, a vacuum tube amplifier in the case including an output transformer adapted to be electrically connected to said receiver, an inductive pickup coil mounted in the case adapted to respond to the audio frequency magnetic field of an adjacent telephone receiver, a magnetic feedback neutralizing element of high magnetic permeability mounted beside the coil in a position to distort the shape of the audio frequency magnetic leakage field from said transformer in order to keep most of the lines of force in said transformer field from threading the coil, and means for electrically connecting said coil to said amplifier to provide for inductive pickup from the telephone receiver.

4. In a wearable hearing aid having a receiver, a case adapted to be worn by a hard of hearing person, a vacuum tube amplifier in the case including an output transformer adapted to be electrically connected to said receiver, an inductive pickup coil mounted in the case adapted to respond to the audio frequency magnetic field of an adjacent telephone receiver, a magnetic feedback neutralizing element of high magnetic permeability disposed beside the coil, means adjustably connecting said element to the case in a position where it will distort the shape of the audio frequency magnetic leakage field from said transformer to keep most of the lines of force in said transformer field from threading the coil, and an electric switch for electrically connecting said coil to said amplifier to provide for inductive pickup from the telephone receiver.

5. In a wearable hearing aid having a receiver, a case adapted to be worn by a hard of hearing person, a vacuum tube amplifier in the case including an output transformer adapted to be electrically connected to said receiver, an inductive pickup coil mounted in the case adapted to respond to the audio frequency magnetic field of an adjacent telephone receiver, a magnetic feedback neutralizing element of high magnetic permeability disposed between the coil and the front of the case, a fastener extending through said element and adjustably connecting it to the front of the case, whereby said element can be moved into a position where it will distort the shape of the audio frequency magnetic leakage field from said transformer to keep most of the lines of force in said transformer field from threading the coil, and an electric switch for electrically connecting said coil to said amplifier to provide for inductive pickup from the telephone receiver.

6. In a wearable hearing aid having a receiver, a case adapted to be worn by a hard of hearing person, a vacuum tube amplifier in the case including an output transformer adapted to be electrically connected to said receiver, an inductive pickup coil mounted in the case adapted to respond to the audio frequency magnetic field of an adjacent telephone receiver, a magnetic feedback neutralizing element of high magnetic permeability mounted between the coil and the front of the case, said element being adapted to over-neutralize said feedback, a second neutralizing element of high magnetic permeability disposed on the opposite side of the coil, means adjustably connecting said second element to the front of the case in a position where it will counteract said over-neutralization the amount necessary to distort the shape of the audio frequency magnetic leakage field from said transformer only enough to keep most of the lines of force in said transformer field from threading the coil, and means for electrically connecting said coil to said amplifier to provide for inductive pickup from the telephone receiver.

7. A wearable hearing aid unit for use with a receiver, comprising a case adapted to be worn by a hard of hearing person, a vacuum tube amplifier in the case including an output transformer adapted to be electrically connected to said receiver, an inductive pickup coil mounted in the case adapted to respond to the audio frequency magnetic field of an adjacent telephone receiver, a magnetic feedback neutralizing element of high magnetic permeability mounted beside the coil in a position to distort the shape of the audio frequency magnetic leakage field from said transformer in order to keep most of the lines of force in said transformer field from threading the coil, and electricity conducting means for connecting said coil to said amplifier to provide for inductive pickup from the telephone receiver.

8. A wearable hearing aid for use with a receiver, comprising a case adapted to be worn by a hard of hearing person, a vacuum tube amplifier in the case including an output transformer adapted to be electrically connected to said receiver, an inductive pickup coil which is much smaller than the case mounted inside the case and adapted to respond to the audio frequency magnetic field of an adjacent telephone receiver, the positions of the coil and transformer relative to each other being such that the magnetic lines of force in the vicinity of the coil emanating from the transformer are substantially parallel to the plane of the coil, said coil being spaced far enough from said transformer to avoid an objectionable amount of feedback from the transformer, and electricity conducting means for connecting said coil to said amplifier to provide for inductive pickup from the telephone receiver.

9. A wearable hearing aid for use with a receiver, comprising a case adapted to be worn by a hard of hearing person, a vacuum tube amplifier in the case including an output transformer adapted to be electrically connected to said receiver, an inductive pickup coil which is much smaller than the case mounted inside the case and adapted to respond to the audio frequency magnetic field of an adjacent telephone receiver, the positions of the coil and transformer relative to each other being such that the magnetic lines of force in the vicinity of the coil emanating from the transformer are substantially parallel to the plane of the coil, said coil being spaced from said transformer a distance at least as great as the length of the transformer core to avoid an objectionable amount of feedback from the transformer, and electricity conducting means for connecting said coil to said amplifier to provide for inductive pickup from the telephone receiver.

SAMUEL F. LYBARGER.

REFERENCES CITED

The following references are of record in the file of this patent:

UNITED STATES PATENTS

| Number | Name | Date |
|---|---|---|
| 2,005,973 | Hellman | June 25, 1935 |
| 2,268,665 | Loewe | Aug. 6, 1942 |
| 2,327,136 | Shapiro | Aug. 17, 1943 |
| 2,336,828 | Zarth | Dec. 14, 1943 |

FOREIGN PATENTS

| Number | Country | Date |
|---|---|---|
| 107,903 | Australia | July 5, 1939 |
| 495,171 | Great Britain | Nov. 8, 1938 |